United States Patent
Alexander

(10) Patent No.: US 11,740,999 B2
(45) Date of Patent: Aug. 29, 2023

(54) CAPTURING TRANSITION STACKS FOR EVALUATING SERVER-SIDE APPLICATIONS

(71) Applicant: JPMORGAN CHASE BANK, N.A., New York, NY (US)

(72) Inventor: Shawn Wesley Alexander, Pearland, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 174 days.

(21) Appl. No.: 16/952,453

(22) Filed: Nov. 19, 2020

(65) Prior Publication Data

US 2021/0157710 A1 May 27, 2021

Related U.S. Application Data

(60) Provisional application No. 62/939,323, filed on Nov. 22, 2019.

(51) Int. Cl.
*G06F 11/36* (2006.01)
*G06F 9/451* (2018.01)
(Continued)

(52) U.S. Cl.
CPC .......... *G06F 11/366* (2013.01); *G06F 9/451* (2018.02); *G06N 20/00* (2019.01); *H04L 67/10* (2013.01)

(58) Field of Classification Search
CPC ......... G06F 9/451; G06F 11/366; H04L 67/10
See application file for complete search history.

(56) References Cited

U.S. PATENT DOCUMENTS 8,260,739 B1 * 9/2012 Pelletier ............... G05B 19/042
700/32
10,223,644 B2 * 3/2019 Gadde .................... G06N 20/00
(Continued)

OTHER PUBLICATIONS

Joao Pedro Gomes Silva, "Debugging Microservices" published by University PORTO, pp. 1-99, Jul. 22, 2019 (Year: 2019).*
(Continued)

*Primary Examiner* — S. Sough
*Assistant Examiner* — Zheng Wei
(74) *Attorney, Agent, or Firm* — Greenberg Traurig LLP

(57) ABSTRACT

Systems and methods for replaying events involving a transaction are disclosed. A method for monitoring server-side application execution may include: (1) deploying an application having a plurality of microservices to a cloud environment, wherein each microservice is associated with an agent that collects execution information for the microservice; (2) executing a transaction with the application; (3) a first microservice of the plurality of microservices assigning a unique identifier to the transaction and executing a first portion of the transaction; (4) the agent for the first microservice collecting first portion execution information in a transaction log and associating the transaction log with the unique identifier; (5) a second microservice of the plurality of microservices executing a section portion of the transaction; (6) the agent for the second microservice collecting second portion execution information in the transaction log associated with the unique identifier; and (7) outputting the transaction log.

14 Claims, 6 Drawing Sheets

(51) Int. Cl.
    *G06N 20/00*       (2019.01)
    *H04L 67/10*       (2022.01)

(56) References Cited

U.S. PATENT DOCUMENTS

| | | | |
|---|---|---|---|
| 10,489,279 B2* | 11/2019 | Rajagopalan | G06F 16/9024 |
| 10,540,259 B1* | 1/2020 | Kramer | G06F 11/3636 |
| 2009/0307763 A1* | 12/2009 | Rawlins | G06F 11/2294 |
| | | | 714/E11.002 |
| 2018/0039567 A1* | 2/2018 | Rajagopalan | G06F 11/3672 |
| 2018/0239690 A1* | 8/2018 | Balestrazzi | G06F 11/366 |
| 2018/0247218 A1* | 8/2018 | Fiumara | G06N 5/022 |
| 2019/0012255 A1* | 1/2019 | Mola | G06F 11/3636 |
| 2019/0182343 A1* | 6/2019 | Lodha | G06F 9/5061 |
| 2020/0233692 A1* | 7/2020 | Kan | G06F 8/61 |
| 2021/0133015 A1* | 5/2021 | Agarwal | G06F 11/36 |
| 2021/0141900 A1* | 5/2021 | Brown | G06F 21/566 |

OTHER PUBLICATIONS

Santana et al., "Transparent Tracing of Microservice-based Applications", published by ACM, SAC'19, Apr. 8-12, 2019, Limassol, Cyprus, pp. 1252-1259 (Year: 2019).*

* cited by examiner

FIG. 2

CAPTURING TRANSITION STACKS FOR EVALUATING SERVER-SIDE APPLICATIONS

RELATED APPLICATIONS

This application claims priority to, and the benefit of, U.S. Provisional Patent Application Ser. No. 62/939,323, filed Nov. 22, 2019, the disclosure of which is hereby incorporated, by reference, in its entirety.

BACKGROUND OF THE INVENTION

1. Field of the Invention

Embodiments generally relate to debugging and evaluating errors or issues in server-side applications.

2. Description of the Related Art

Problems may arise in server-side software applications that may necessitate debugging and evaluation. Application monitoring, orchestration management, or log viewing are reactive systems that look at real time measures to detect a problem with software applications. Such systems do not include proactive identification of possible problems or the ability to perform root cause analysis after the fact.

In the context of cloud-computing, a runtime container may be shut down (and likely may be shut down without warning) at any time. This means that relying on existing tools and techniques in legacy infrastructure to review and diagnose problems may be insufficient as the container involved in an error may be shut down by the time that efforts are taken to evaluate an issue. Existing solutions also suffer from the fact they are limited in the type of data they capture and are not suitable for predicting where additional problems may happen within a server-side application.

SUMMARY OF THE INVENTION

Systems and methods for debugging and evaluating errors or issues in server-side applications are disclosed. According to one embodiment, in an information processing apparatus comprising at least one computer processor, a method for monitoring server-side application execution may include: (1) deploying an application having a plurality of microservices to a cloud environment, wherein each microservice may be associated with an agent that collects execution information for the microservice; (2) executing a transaction with the application; (3) a first microservice of the plurality of microservices assigning a unique identifier to the transaction and executing a first portion of the transaction; (4) the agent for the first microservice collecting first portion execution information in a transaction log and associating the transaction log with the unique identifier; (5) a second microservice of the plurality of microservices executing a section portion of the transaction; (6) the agent for the second microservice collecting second portion execution information in the transaction log associated with the unique identifier; and (7) outputting the transaction log.

In one embodiment, the first portion execution information and the second portion execution information each comprise at least one of a class name, a method name, a method signature, an argument, a return object, an exception, a field detail, a start time, an end time, and an elapsed time.

In one embodiment, the method may further include deleting the transaction log in response to successful execution of the transaction.

In one embodiment, the method may further include identifying a root cause of an unsuccessful execution of the transaction using the transaction log.

In one embodiment, the method may further include executing an action in response to an unsuccessful execution of the transaction based on the transaction log.

In one embodiment, the action may include at least one of modifying input data for the transaction, adding memory resources, adding CPU resources, and adding storage resources.

In one embodiment, the action may be selected based on a trained machine learning model.

In one embodiment, the method may further include training the machine learning model with a result of the application of the action.

In one embodiment, the method may further include replaying the execution of the transaction at a user interface based on the transaction log.

According to another embodiment, a system for monitoring server-side application execution may include a cloud environment comprising an application comprising a plurality of microservices, and each microservice may be associated with an agent that collects execution information for the microservice; a data store storing a transaction log comprising the execution information for the microservices; and a user interface that outputs the transaction log. A first microservice of the plurality of microservices may assigns a unique identifier to a transaction and may execute a first portion of the transaction; the agent for the first microservice may collect first portion execution information in the transaction log and may associate the transaction log with the unique identifier; a second microservice of the plurality of microservices may execute a section portion of the transaction; the agent for the second microservice may collect second portion execution information in the transaction log associated with the unique identifier; and the user interface may output the transaction log.

In one embodiment, the first portion execution information and the second portion execution information each comprise at least one of a class name, a method name, a method signature, an argument, a return object, an exception, a field detail, a start time, an end time, and an elapsed time.

In one embodiment, the system may further include a director application in communication with the plurality of agents and the data store, wherein the director application deletes the transaction log in response to successful execution of the transaction.

In one embodiment, the system may further include an analysis module, wherein the analysis module identifies a root cause of an unsuccessful execution of the transaction using the transaction log.

In one embodiment, the system may further include an analysis module, wherein the analysis module identifies an action to take in response to an unsuccessful execution of the transaction based on the transaction log and communicates the action to one or more agent for implementation.

In one embodiment, the action may include at least one of modifying input data for the transaction, adding memory resources, adding CPU resources, and adding storage resources.

In one embodiment, the action may be selected based on a trained machine learning model.

In one embodiment, the user interface may replay the execution of the transaction based on the transaction log.

BRIEF DESCRIPTION OF THE DRAWINGS

For a more complete understanding of the present invention, the objects and advantages thereof, reference is now made to the following descriptions taken in connection with the accompanying drawings in which:

FIG. 2 depicts an exemplary user interface generated by a replay system according to one embodiment;

DETAILED DESCRIPTION OF PREFERRED EMBODIMENTS

Figure 1:
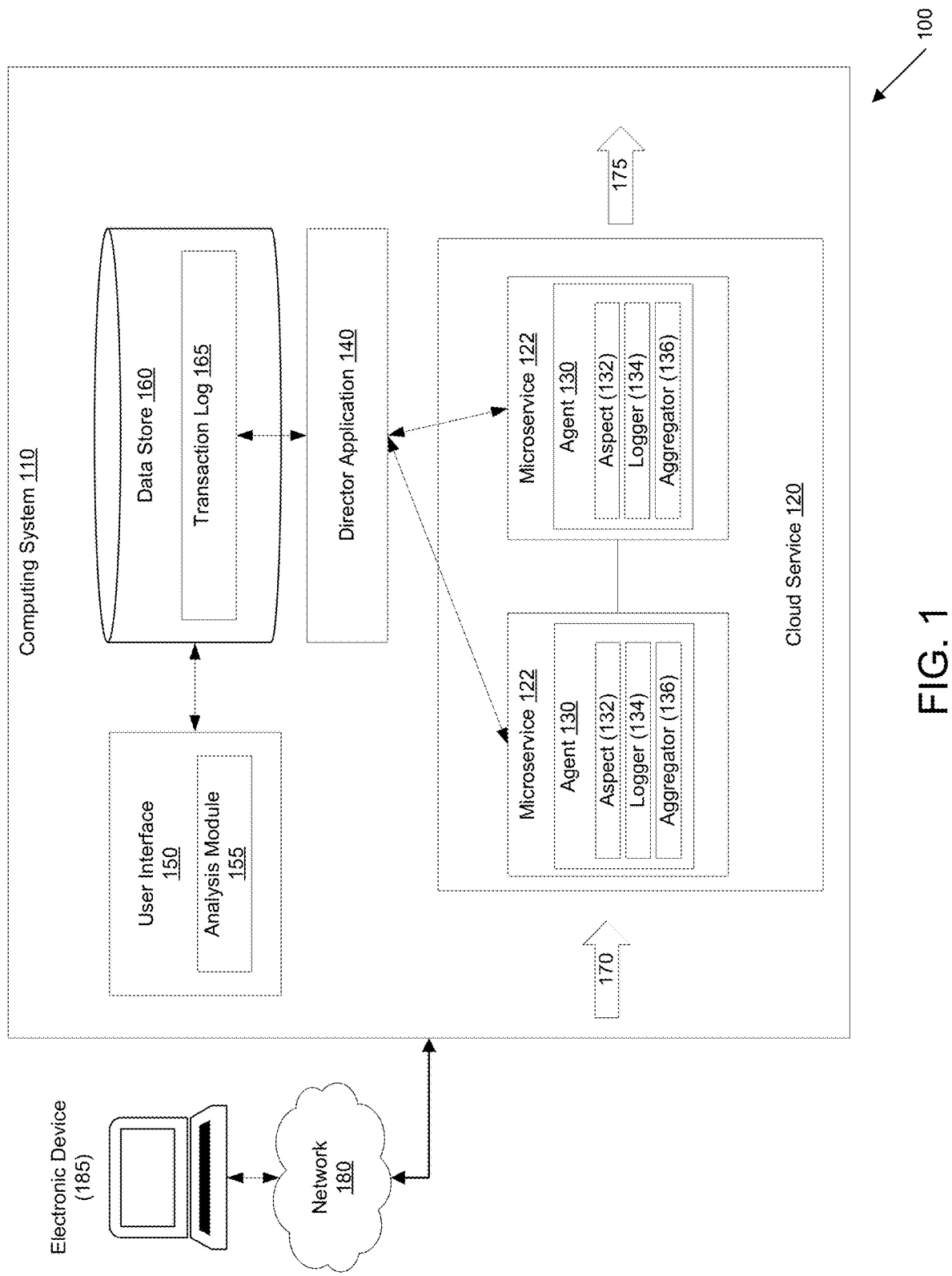
FIG. 1 depicts a reply system according to one embodiment.

Embodiments generally relate to systems and methods for replaying events involving a transaction. A system, such as a replay system, may execute an agent in each microservice of a server-side application. For example, each agent may capture, log, or otherwise record the activity of each incoming input as it may be processed by the microservice. A director application may establish communication with each agent to track a transaction that may be processed by the server-side application. A transaction may flow through multiple microservices so that its processing may be divided into various inputs into the microservices. A director application may capture the processing of the single transaction through multiple microservices. Details about the transaction may be stored in a datalog that indicates various processing states as the transaction is processed.

The server-side application may be implemented as a cloud-based application. It may be provided as a cluster, a pod, or a node that performs a cloud-based service. The server-side application may be implemented as several microservices. A microservice may comprise a container.

Each agent of the system may be a "sidecar" that sits alongside a cloud-based service that tracks not just container information, but information about the execution of the transaction. When problems or errors are during the processing of a transaction by the server-side application, the system may persist the transaction stack that caused the error in a persistent store. In addition, the system may notify other agents of the failure.

In one embodiment, a machine algorithm may detect the likely cause of the problem, and the other agents may take corrective action as necessary to prevent a cascading failure. Corrective action may include, for example, spinning up additional pods, clusters, or services, deploying new instances of the workloads to other providers, deploying to other nodes in the same provider, or taking no action. Over time, the algorithm may learn based on the type of failure and the system characteristics just before failure, what the likely impact on other workloads running in the nodes.

Embodiments provide application developers and operate teams the ability to inspect the execution stack of applications in detail. Using aspect-oriented programming (AOP), application developers may collect information about the thread of execution and the methods called by the thread. When errors occur, or when other application-specific criteria are met, a trace file containing the inspected stack may be persisted. When questions arise about the message being processed, an operate team may load the trace file to a simple user interface (UI) and determine what occurred at the time of execution.

Thus, embodiments may allow for transactions to be "replayed" without the burden of moving data into test environments and without the risk of inadvertently altering data in your production environment.

Embodiments may provide developers and operators a way to replay a message, step through method and stack calls, view the message call stack, and step forward and backward in the processing at will. In production environments, embodiments may provide access to developers of what may be happening inside the cloud runtime environment without using burdensome remote debuggers or installing heavy-weight probes.

Embodiments may store information about a call stack for a thread of execution in the container during the runtime of the cloud workload. If an exception may be encountered on the thread, embodiments may build and log out the stack information accumulated over the thread to disk, for investigation or analysis. If exceptions are not encountered, embodiments may remove the call stack information for the thread and accumulate it again when the thread may be reused later.

Embodiments of the present are described with respect to the figures. It is understood that the figures provide examples of ways to implement embodiments of the present disclosure and are therefore not limiting.

FIG. 1 illustrates system 100 according to embodiments. System 100 may be implemented in a networked environment that includes computing system 110 made up of a combination of hardware and software. Computing system 110 includes data store 160. Computing system 110 includes several executable software programs. Computing system 110 executes a server-side software application such as, for example, cloud service 120. Cloud service 120 may employ a cluster, a pod, or a collection of containers to carry out the processing of a transaction. Cloud service 120 may provide a service for processing a payment or any other cloud-based service. As described herein, cloud service 120 may be subject to analysis and debugging in the event of a failure.

Cloud service 120 may include a plurality of microservices 122. Each microservice 122 may be implemented using a container or any other suitable processing unit. Each microservice 122 may receive an input, process the input, and generate a corresponding output. Microservices 122 may be chained together to carry out the functionality provided by cloud service 120.

In embodiments, agent 130 may execute within each microservice 122. Agent 130 may be considered a "sidecar" that it runs in parallel with respect to microservice 122. Agent 130 may be configured to record the state of corresponding microservice 122 as it processes inputs.

Computing system 110 may further include director application 140. Director application 140 may communicate with each agent 130 to provide orchestration as each microservice 122 processes inputs to carry out the service provided by cloud service 120. Director application 140 may perform the operations of an aggregator that combines the status and states of microservices 122 as microservices 122 process one or more transaction 170.

Cloud service 120 may process one or more transaction 170. Transaction 170 may be handled by at least some microservices 122 in a serial manner. Cloud service 120 may generate processed transaction 175. Processed transaction 175 may result in an error and if so, system 100 may be configured to provide evaluation and debugging capabilities. Specifically, as transaction 170 is processed, agents 130 and director application 140 together record the status of the processing in transaction log 165 in data store 160. Transaction log 165 contains the processing state of various microservices 122 as transaction 170 is processed.

Computing system 110 may be coupled to network 180, such as the Internet, intranets, extranets, wide area networks (WANs), local area networks (LANs), wired networks, wireless networks, or other suitable networks, etc., or any combination of two or more such networks. In this respect, one or more electronic devices 185 (e.g., client devices) may access transaction log 165 to perform debugging and evaluation of processed transactions 175 that are subject to an error.

System 100 allows a developer to know what happened when a process of cloud service 120 has failed by "replaying" certain events on electronic device 185 via user interface 150. System 100 may provide application developers and operate teams an ability to inspect the execution stack of applications running on cloud systems. Using AOP, application developers may collect information about the thread of execution and the methods called by the thread. These messages may be prepended with a globally unique ID that allows the capture and correlation of events across various microservices 122. When errors occur (or other application specific criteria may be met), an endpoint (e.g., an REST endpoint) may be called to persist the information collected containing the inspected stack may be persisted to disk.

System 100 may provide advantages over common application monitoring solutions in that it provides historical information (the inspection may happen and the data stored to disk previously) and detailed information about the state of calls when an error occurred.

In some embodiments, unlike tools that rely on log messages and details to be stored and communicated to a centralized repository where regular expressions may determine the information, embodiments may only store events when failures occur to allow users the flexibility to store as little or as much information as required.

Analysis module 155 may be provided as part of user interface 150; in another embodiment, it may be deployed to cloud service 120; in still another embodiment, it may be a stand-alone component. Analysis module 155 may perform at least some of the following: (1) receive replay messages from agent(s) 130; (2) store replay messages in data store 160; (3) analyze defects (if any are found) and retrieve comparable scenarios from data store 160; (4) apply artificial intelligence/machine learning algorithms to identify prior conditions (for the same application or similar applications), resolutions, or possible remedies/actions to take; (5), use a weight derived algorithm to score the remedy/action with the best possibility of success (prioritizing prior successful resolutions); (6) send remedy/action back to agent(s) 130 for application, if any meet a confidence threshold (e.g., over 90%) of success; (7) store message, remedy/action, success criteria in data store 160; (8) obtain from agent(s) 130 the result of application of the remedy/action; and (8) store the remedy/action result in data store 160.

Figure 2:
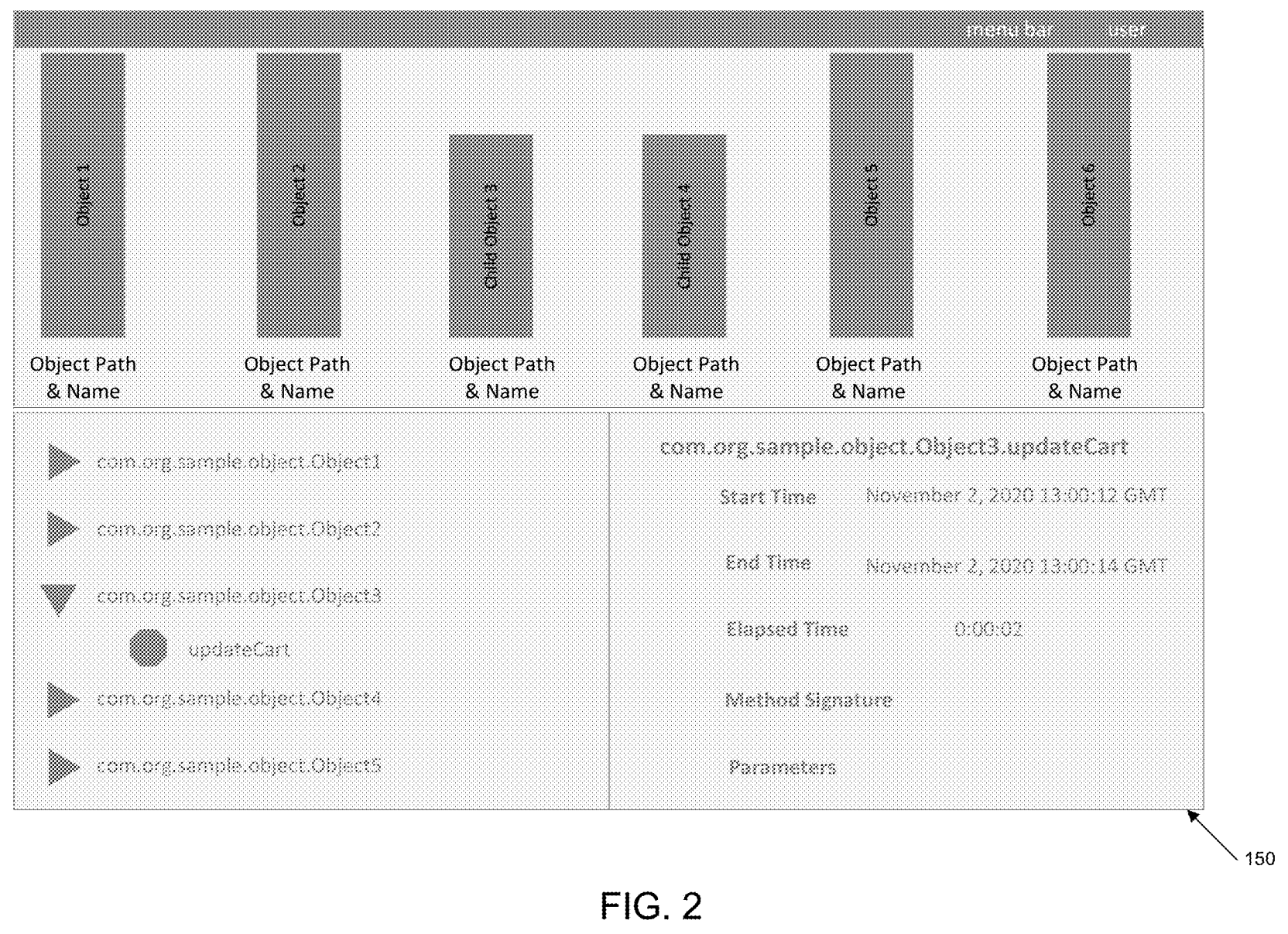

FIG. 2 depicts an exemplary user interface generated by the system of FIG. 1, according to embodiments. User interface 150 may be generated by system 100, formatted as a web-based document, and transmitted to electronic device 185 over network 180 to be rendered for display. As shown in FIG. 2, user interface 150 may show data based on a "dump" of an inspected thread of execution.

Referring again to FIG. 1, system 100 may store information about a call stack for a thread of execution in cloud service 120 using a Java Virtual Machine (JVM) during the runtime of the JVM. If an exception is encountered on the thread, system 100 may build and store out the stack information accumulated over the thread to data store 160 for investigation or analysis. If exceptions are not encountered, system 100 may remove the call stack information for the thread and accumulate it again when the thread may be reused later. Thus, transaction log 165 may be automatically updated to reflect call stack information that relates to transactions 170 that experienced an error or exception.

System 100 may provide a mechanism to record the status or state of a method of execution for a specific call without having to replay the message if an exception occurs. For each method invoked (that may be configured to be inspected by the system 100), the following may be stored as part of transaction log 165: a class name (e.g., the name of the class invoked by a microservice 122), a method name (e.g., the name of the method invoked by a microservice 122 (e.g., doWork( ))); a method signature (e.g., the full method signature used by a microservice 122 (e.g., public void doWork (Trade trade) throws Application Exception)); arguments (e.g., className and value for each argument); a return object (e.g., className and value for the return object); an exception (e.g., a log of any exceptions thrown from the method invocation that may include exception class (e.g., the class name of the exception), message (e.g., a message for the exception such as (Throwable.getMessage( ))), and a stack trace (e.g., the exception stack trace)); field details (e.g., field information for the object invoked in the stack may be obtained only when a deep dive occurs and the target object has available fields for obtaining values; a start time (e.g., start time for the method inspection); end time (e.g., end time for the method inspection); an elapsed time (e.g., total time taken for method execution); etc. Any other information or data may be collected as is necessary and/or desired.

In embodiments, system 100 may aspect introspect method calls at runtime within the JVM. The purpose of the aspects may be to gather information required by application components in the most performance effective manner possible. There may be two types of interceptions that are allowed: beginning (and consequently end) stack introspection, and inter-stack introspection.

Beginning/end introspection are points in the stack execution where replay may begin and end processing. This represents the beginning and end of the thread execution where the thread stack at and below this method invocation should be introspected. In simpler terms, this may be the start/endpoint for each thread introspection. The purpose for separating this type of introspection out may be that some specialized processing may take place at the start and end of the replay dive, in order to initialize the aggregator (discussed below) and at the endpoint, logging of replay information for the dive if needed.

Note that this beginning/ending introspection point might not necessarily be the starting point and ending point of a thread of execution. Developers may select a subset of method invocations to inspect in the replay dive.

During the dive, thread execution stack information may be gathered for each aspected method call. That information may be cached, indexed by its thread id. According to embodiments, at the end of each inspection run, the cache of information may be removed (regardless if an exception occurred or not), in order to prevent it from being incorrectly attributed to the next request to use the thread.

At the end of the dive, additional functionality may be executed to determine if the dive should be logged. This may be done by verifying if an exception has occurred or not. In the default implementation this may be signaled by any throwable being thrown from the start stack method.

Other than removing the thread information at the end of a replay stack dive and logging data out to the file system when needed, the beginning join point may behave like a normal inter-stack introspection in the types and scope of information gathered. The method to determine that a dive may be logged may be overwritten by subclasses for application specific customization.

Inter-stack introspection may occur when a method that may be aspected in the processing chain after the begging introspection for the thread of execution may be invoked. This may represent a child in the stack trace being watched by the replay components. Each introspected stack element may be added to the list of inspected method calls for the thread of execution.

Cloud service 120 may be implemented in a JVM that executes in runtime to process transaction 170. System 100 generates transaction log 165 that indicates what happened inside the JVM during runtime of cloud service 120, for example, when an exception or error occurs.

Agent 130 may include several services or modules, such as aspect module 132, logger 134, and aggregator 136. Aspect module 132 (e.g., AbstractDiveAspect and subclasses) may perform the work of obtaining information about the thread of execution and the method being invoked at runtime. They are executed by the aspect container (e.g., Spring AOP or AspectJ) when a method being aspected may be invoked. Aspect module 132 may be an abstract class that provides the base functionality for aspecting method calls.

Aggregator 136 may be responsible for caching replay inspections performed in a thread of execution at runtime and storing that data until it may be either deleted or saved to disk. In embodiments, all replay inspections may be cached and indexed on the current thread id. If the replay dive information is not removed and stored to disk, it may be flushed from the aggregator cache before the current thread of execution completes, in the event that the thread may be reused.

A replay model (not shown) may be part of agent 130 and may be a simple Plain Old Java Object (POJO) holding the information obtained in the dive, populated by aspect module 132 and stored in aggregator 136 for the thread. The replay model may comprise a single object (e.g., ReplayDetail) that contains the details of each method introspection, including, for example, ThreadId (e.g., a string identifying the Thread id for the dive); MethodParameterDetail (e.g., Map <String, String>); method parameter values, where the key may be a string value of the classname for the parameter and the value may be the value of the argument; ClassName (e.g., a string identifying the name of the class invoked, including the package name); MethodName (e.g., a string identifying the name of the method invoked); MethodSignature (e.g., a string identifying the signature of the method invoked, including arguments; FieldDetail (e.g., a string value of the fields on the object); Exception (e.g., a string representation of exception encountered in the invocation of the method, if any); ReturnObject (e.g., a string value of the returnObject, or null if a void method); StartTime (e.g., the start time for the method invocation, in milliseconds); EndTime (e.g., the end time for the method invocation, in milliseconds); ElapsedTime (e.g., the total time for method invocation, in milliseconds); etc. Additional, fewer, or different details may be used as is necessary and/or desired.

Logger 134 may be responsible for logging the replay dive to storage, such as a data store 160. This may occur when an exception occurs for the thread of execution that the application components may want to log the thread dive for later inspection. Logger 134 may format replay dives as XML strings when logging them.

Replay reading modules (not shown) may be part of user interface 150 and may include one or more components, matched against the logging objects that read stored replay dives and rebuild the replay detail objects from the dive for the thread. Replay reading modules may be leveraged outside of user interface 150 for, for example, programmatic access to the data.

In embodiments, each replay dive stored to data store 160 may be for a single thread of execution, and nay contain the individual method inspections for that one thread. Multiple thread dives may result in multiple files stored to disk.

Aspect module 132 may perform functionality such as creating and populating the ReplayDetail object for the current dive, adding the replay information in aggregator 136 for the current thread of execution, logging the ReplayDetail list at the end of the dive, and purging stale ReplayDetail information for the thread of execution at the end of its execution.

Figure 3:
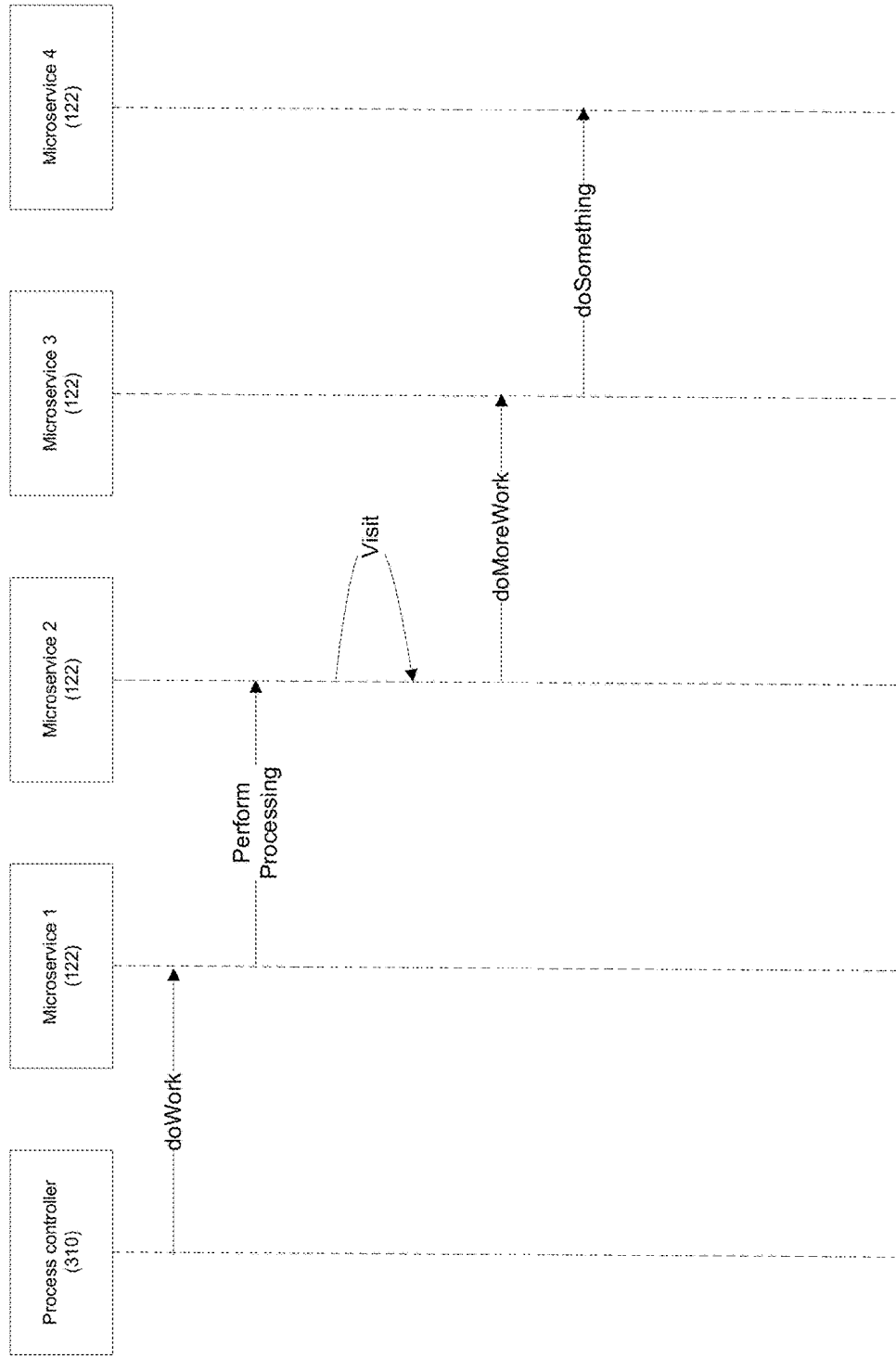
FIG. 3 depicts an example of processing transaction according to one embodiment.

Aspect module 132 may perform a plurality of types of introspections, including begin stack introspection and inter-stack introspection. The begin stack introspection represents the first inspection of a method for the thread of execution. This is depicted in the example of FIG. 3. Microservices 122 may be different microservices 122 that serially the process a transaction. Process controller 310 may be a subcomponent of director application 140 that orchestrates the processing of the transaction among several microservices 122 (e.g., microservices 1, 2, 3, and 4)

Figure 4:
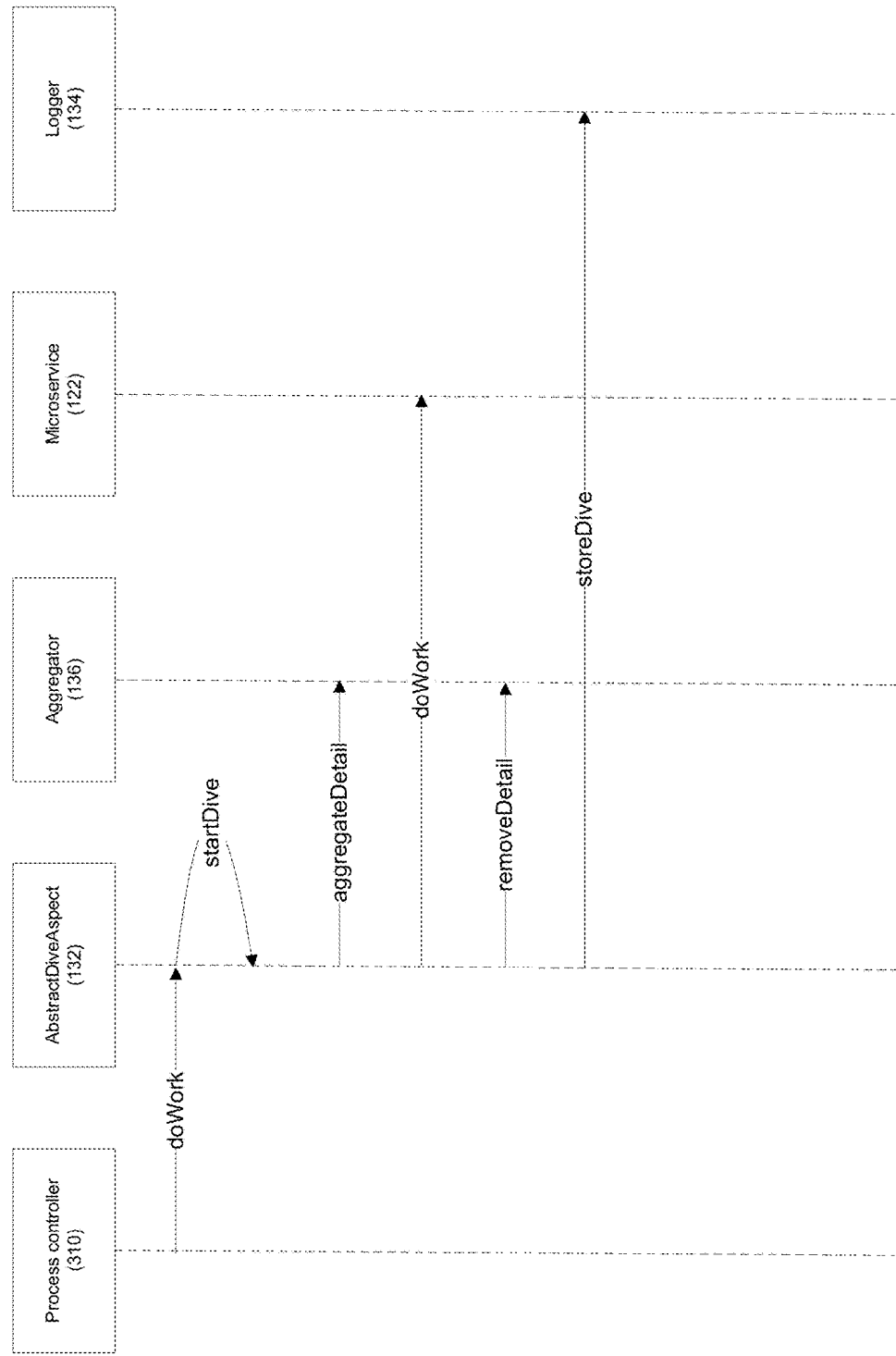
FIG. 4 depicts an example of processing transaction according to another embodiment.

FIG. 4 depicts an example of inter-stack introspection according to an embodiment. For example, microservice 122 (e.g., component 1) may have its doWork method inspected as the begin stack introspection point. From a code perspective, the call by process controller 310 does not change. Below is an example of code illustrating the example of FIG. 4.

Component1 component=new Component1( );
component.doWork(param1);

As shown in this example, however, the doWork method call may be intercepted and re-routed to aspect module 132, which builds the ReplayDetail for the method invocation and stores it in aggregator 136. Then, the doWork call may be allowed to proceed and microservice 122 (e.g., component 1) may be invoked. Internally, aspect module 132 may perform the following operations

```
@Around("execution(*com.website.tradeprocessing.Component1.doWork(..)")
public Object performStartProcessing(ProceedingJoinPoint joinpoint)
{
    return startDive(joinpoint);
}
public Object startDive(ProceedingJoinPoint joinpoint)
{
    try
    {
        // build the replay detail and store it in the aggregator
        buildAndAggregateDive(joinpoint);
        // allow joinpoint to proceed, to call object methods
        // Component1.doWork( );
        joinpoint.proceed( );
    }
```

```
        catch (Throwable t)
        { // exceptions indicate that the dive should be logged for
replay in the UI
            logger.storeDive(Thread.currentThread( ).getName( ));
            //rethrow throwable for app components
            throw t;
        }
        finally
        {
            //remove dive details to prevent other threads form using this
info
Aggregator.getInstance( ).removeDetail(Thread.currentThread( ).get
Name( ));
        }
    }
}
```

The following configuration elements are available for aspect module 132 in the example above. First, diveDeep is a Boolean value that indicates whether or not to perform a "deep dive" on the introspected method values. Diving deep on the introspected methods means that when a value of an aspected object may be inspected, if the toString method is not overwritten, then reflection may be used to obtain the object's value.

The second is AbstractDiveLogger, which is a logger that logs out the dive in the event that an exception condition may be encountered. AbstractDiveLogger may be part for logger 134.

In embodiments, aggregator 136 may cache information gathered from a replay dive for a thread of execution. This allows the dive information to span multiple aspected methods and store information until it is ready to process. Internally, the ReplayDetail data may be cached in a map or similar where the key may be the thread name of the current executing thread (Thread.currentThread.getName( )) and the value may be a list of ReplayDetail. In one embodiment, this information may be part of transaction log 165.

Details may be added at the end of the list. Reordering may be applied by user interface 150 as needed. In embodiments, the use of aggregator 136 may be confined to aspect module 132 and may be hidden from application components or aspects.

Once a replay dive has been identified as something that should be preserved for later inspection by, for example, the operate staff, the replay information may be logged for persistence using, for example, one or more logger 134. Examples of loggers 134 may include a console logger that logs the dive information to a file such as system.out. A Log4J Logger may be useful for debugging and prototyping by logging out replay data using Log4J log appender, a file logger that creates a new file and writes the data out using buffered file writer, and a compressed file logger that logs the data out to a compressed file, using Java's GZIP facilities. These exemplary loggers 134 may log out XML strings to the file system of the data store, which may be a local data store (e.g., a disk) associated with the runtime container, an attached S3 bucket, a remote data store (e.g., a database, a log aggregator, etc.). The logging components are well typed in their inheritance with a view to ensure flexibility by application developers. DiveLogger may be the interface loggers implement.

There may be two abstract classes provided to perform some operations. The first abstract class, AbstractDiveLogger, may perform operations on obtaining and formatting a string of dive detail content, by delegating the formatting of a string representation of the dive list, in addition to logging of the dive information to concrete implementations.

Loggers 134 may extend the second abstract class, AbstractXMLDiveLogger, which formats ReplayDetail for the current thread of execution into an XML string for persistence to disk. The AbstractXMLDiveLogger extends the AbstractDiveLogger and provides some additional common operations on formatting an XML representation of the ReplayDetail. The following concrete logger implementations perform the actual input/output, or I/O.

A console logger may be used primarily during prototyping and debugging. The dive information may be sent as a system.out file. An example of the format of the message may be: [Thread: <threadId>]–<dive detail>

A Log4J logger may use a commons-logging API to log the dive out to a Log4J Log Appender. Applications using this logger may need to configure their log4j.xml file to contain the appropriate information about the appender. The dive data may be logged out to the Log4J Logger, and it may be always logged out at INFO level.

A FileLogger may log the dive information out to a file on the file system. Two parameters may be expected to be set on the FileLogger: directory (e.g., the directory to store the dive information) and file name (e.g., the prefix for the file name).

To achieve uniqueness in the file name to allow multiple dives to be stored in the directory, some variable components of the file name may be necessary. The FileLogger builds a file name that may be unique at the time of logging. The fileName wired into the FileLogger during configuration is an element of the file name and may not be its entirety.

The file name for the file may be created in the following format:

<fileName>.<threadId>.<YYYY>.<MM>.<DD>.
<HH>.<mm>.<ss>.<SSS>.xml

Where:
  fileName—user defined and configured file name prefix
  threadId—id of the thread that created the dive
  YYYY—year of the logging of the dive (e.g., 2007)
  MM—month in year of logging the dive (e.g., 01, 11)
  DD—day in the month of logging the dive (e.g., 01, 30)
  HH—hour in day of logging the dive (e.g., 00, 01, 23)
  mm—minute in the hour of logging the dive (e.g., 01, 59)
  ss—second in minute of logging the dive (e.g., 01, 59)
  SSS—millisecond in second of logging the dive (e.g., 900)

In this manner, the file name may be configured assuming that the filename configuration flag may be unique to the application and that the application does not log two dives on the same thread in the same millisecond.

The file name of the file logger may be overwritten in a subclass to customize the file name used the developer. Applications may include another unique identifier for the message (mq correlation id, trade id, user id, etc.), depending on the type of application, which makes it easier for operate staff to identify when a dive is being logged, and to correlate the dive with the message that caused the issue.

Logger 134 may perform the same functionality and operations as the FileLogger, except that the GZIPOutputStream may be used to zip up the dive data into the file. This logger may be used in UAT and production environments where disk space may be a concern. The compression may be quite significant and a corresponding CompressedFileReader may be used to obtain the information in the user interface for display.

Other than the file format, the another difference between the CompressedFileLogger and the FileLogger may be that the file name extension may be ".xml.gz" instead of ".xml" to denote that the file is in a GZIP format.

In some embodiments, any of the above-described loggers may be subclassed to provide application specific functionality. Additionally, application developers may choose to log dives in a different manner (perhaps to a database).

Along with writing out to a persistence storage such as, for example, data store 160, the components of the system 100 may also include corresponding readers to read the persisted information and rebuild the list of ReplayDetail call stack for the dive.

Readers may be used by user interface 150 to build, populate, and display the call stack. Methods of storing dives may have a corresponding reader.

An abstract class may perform the parsing of the contents of the file (assumed to be in XML format), using a simple Document Object Model (DOM) reader. Application developers may wish to read the XML files using a different parser or may wish to customize the reader to read dives in a different persisted format.

Readers may include a FileReader which may be a base file reader that reads .xml files with the XML of the replay dive stored. This reader may be analogous to the FileLogger component. The FileReader takes a String of the directory and fileName of the file to read and uses a simple FileInputStream to read the contents of the file.

In embodiments, reader may be a compressed file reader. The CompressedFileReader may be used to read dives stored in GZIP format by the CompressedFileLogger. This reader is like the FileReader in that it reads XML content of the replay project from a file stored on disk. One difference, however, may be that it reads files compressed in the GZIP format.

The CompressedFileReader may be primarily used by the Replay UI, but application developers that wish to read a replay dive to programmatically invoke the CompressedFileReader.

Figure 5:
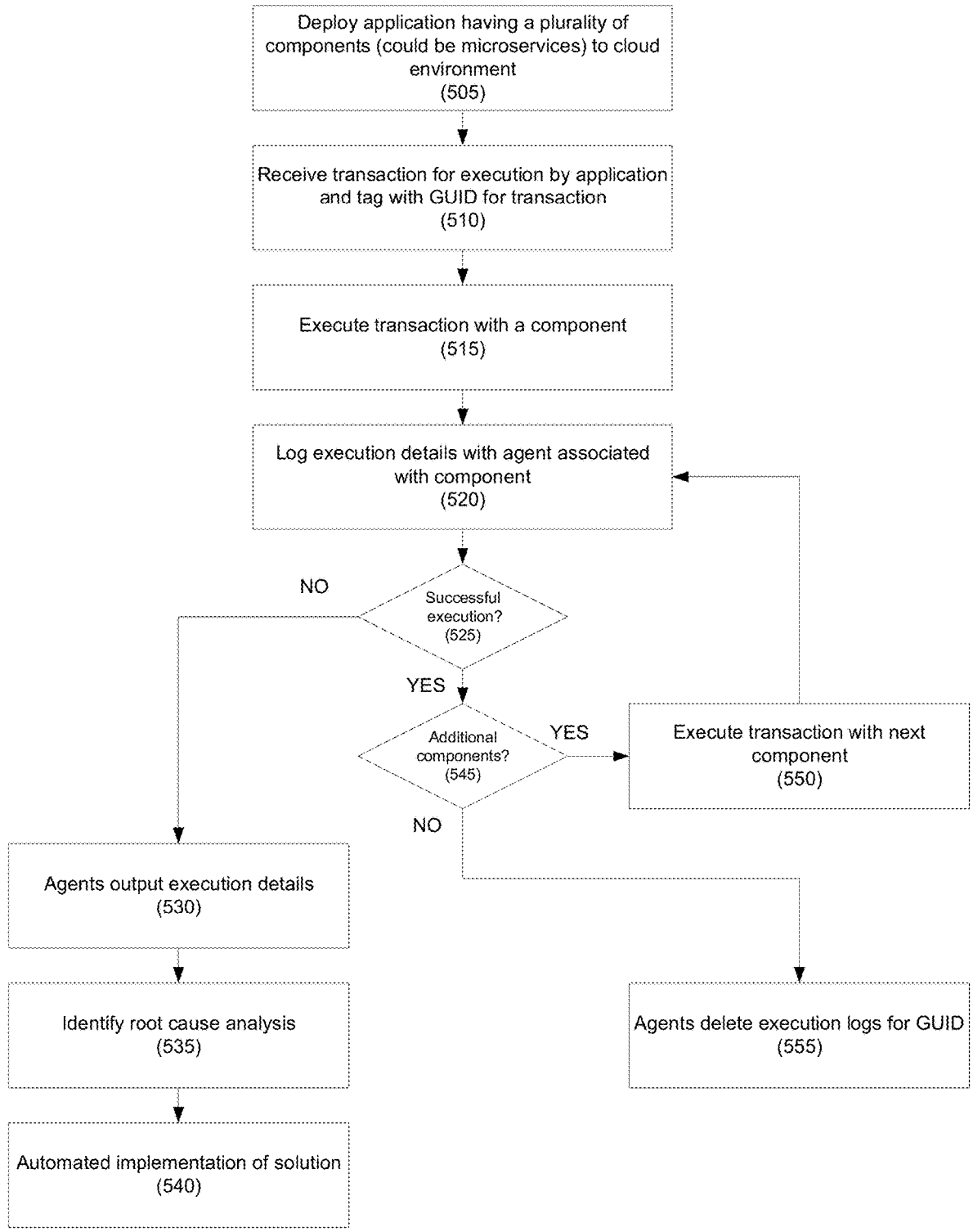
FIG. 5 depicts a method for monitoring server-side application execution according to an embodiment.

Referring to FIG. 5, a method for monitoring server-side application execution according to an embodiment is provided according to an embodiment.

In step 505, an application having a plurality of components may be deployed to one or more cloud environments. In one embodiment, each component may be associated with an agent that may collect information on the execution of a transaction executed by the application.

In one embodiment, the application may be a cloud service, and the components may be microservices.

In one embodiment, the agents may be assigned to a component by configuring the component(s). For example, the agents may be assigned at deployment as part of the component build and deployment process.

In step 510, a transaction for execution may be received by the application. The agent associated with the first component for the application may identify or create a globally unique identifier (GUID) for the transaction, and may communicate the GUID to the other agents associated with the other components.

In one embodiment, the GUID may have a logical association with the transaction; in another embodiment, the GUID may have no such relation.

In step 515, the first component may execute the transaction, and in step 520, during execution, the agent may collect information on the execution and may store the information in a transaction log. Exemplary execution information that may be collected may include a class name, a method name, a method signature, arguments, a return object, any exceptions, field details, start time, end time, and elapsed time. The transaction log may be associated with the GUID.

In step 525, if the component unsuccessfully (e.g., there was an error, exception, etc.) executed the transaction, in step 530 the agent may output the execution details, and in step 535, any additional remedy/action may be taken as is necessary and/or desired. For example, root cause analysis may be performed to execute the root of the unsuccessful execution. In one embodiment, machine learning may be used to identify the solution.

In one embodiment, an analysis module may identify an action/remedy by retrieving comparable scenarios from the data store. It may apply artificial intelligence/machine learning algorithms to identify prior conditions (for the same application or similar applications), resolutions, or possible remedies/actions to take. It may use a weight derived algorithm to score the remedy/action with the best possibility of success (prioritizing prior successful resolutions) and may send the remedy/action to the agents for application. In one embodiment, the remedy/action may be required to meet a success confidence threshold (e.g., over 90%) before implemented by the agent(s).

The analysis module may receive the results of the remedy/action from the agents and may store the results in the data store. The results may be used to further train a machine learning model.

In one embodiment, in step 540, the solution may be automatically applied. Examples of solutions may include spinning up additional clusters, or services, deploying new instances of the workloads to other providers, deploying to other nodes in the same provider, creating new instances of the component, stopping existing instances (e.g., if corruption occurs), modifying data input to avoid error conditions (e.g., providing a default entry as a value for missing or invalid data, restarting one or more component instances, deleting temporary or cache files (e.g., if disk is full), adding additional memory (e.g., if memory is full), adding additional CPU resources (e.g., if CPUs are needed), adding additional storage (e.g., if disk is full), swapping between functional id and passwords (e.g., if the functional id is locked), etc.

If, in step 525, if the component successfully (e.g., without errors, exceptions, etc.) executed the transaction, in step 545, a check may be made to see if any additional components are needed to execute the transaction. If there are, in step 550, the transaction is executed with the next component, and the execution with the next component is monitored and logged in step 520.

If there are no remaining components needed to execute the transaction, in step 555, the transaction logs associated with the transaction's GUID may be deleted. For example, any remediation efforts, the original message and transaction log, and the results of remediation efforts, etc. may be captured for machine learning purposes to use in future diagnosis and system healing.

Figure 6:
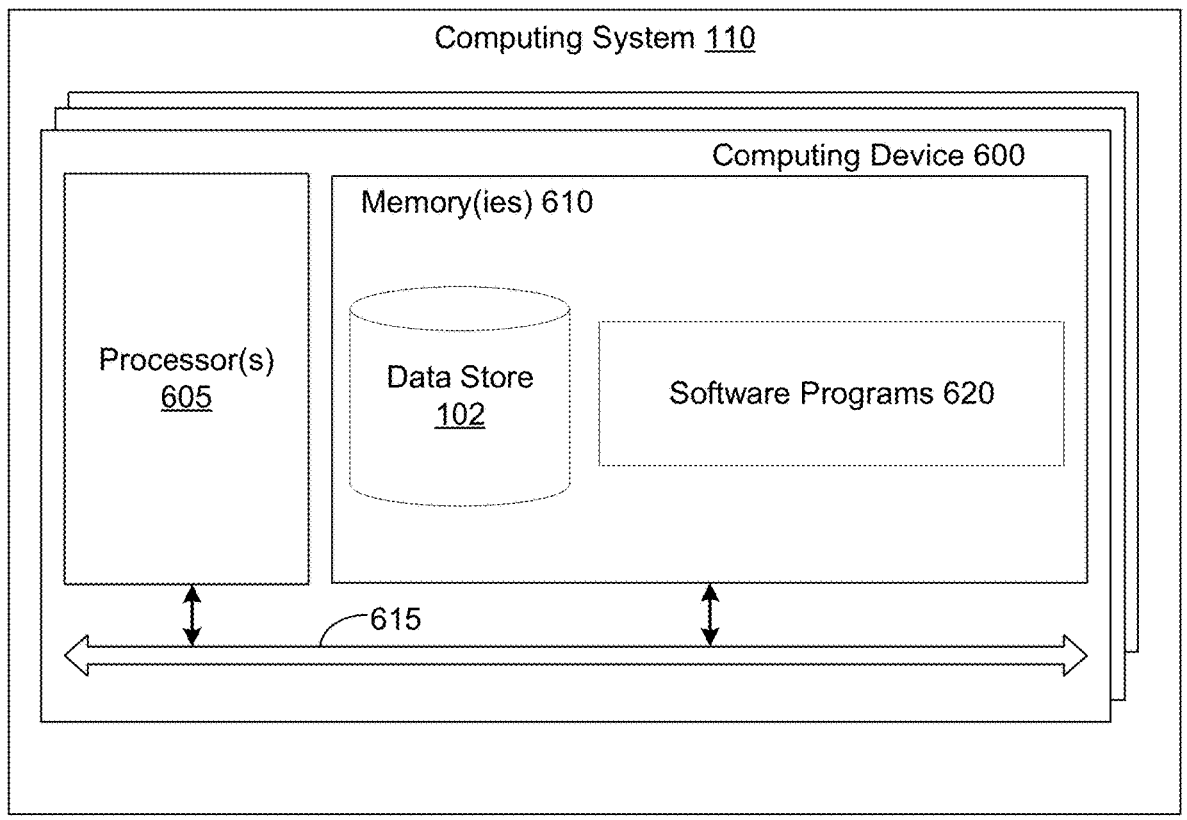
FIG. 6 is a schematic block diagram that provides one example illustration of a computing system according to one embodiment.

FIG. 6 is a schematic block diagram that provides one example illustration of computing system 110 of FIG. 1 according to some embodiments. Computing system 110 may include one or more computing devices 600. Each computing device 600 may include at least one processor circuit, for example, having processor 605 and memory 610, both of which are coupled to local interface 615 or bus. Each computing device 600 may comprise at least one server computer or like device. Local interface 615 may comprise a data bus with an accompanying address/control bus or other bus structure.

Data and several components may be stored in memory 610. The data and several components may be accessed and/or executable by processor 605. Software programs 620 may be stored in memory 610 and executed by processor 605. Data store 102 and other data may be stored in memory 610. An operating system may be stored in memory 610 and executable by processor 605.

Other applications may be stored in memory 610 and may be executable by processor 605. Any component discussed herein may be implemented in the form of software, any one of a number of programming languages may be employed, for example, C, C++, C#, Objective C, Java®, JavaScript®, Perl, PHP, Visual Basic®, Python®, Ruby, or other programming languages.

Several software components may be stored in memory 610 and may be executable by processor 605. The term "executable" may be described as a program file that is in a form that may ultimately be run by processor 605. Examples of executable programs may be, a compiled program that may be translated into machine code in a format that may be loaded into a random access portion of memory 610 and run by processor 605, source code that may be expressed in proper format such as object code that is capable of being loaded into a random access portion of memory 610 and executed by processor 605, or source code that may be interpreted by another executable program to generate instructions in a random access portion of memory 610 to be executed by processor 605, and the like. An executable program may be stored in any portion or component of memory 610, for example, random access memory (RAM), read-only memory (ROM), hard drive, solid-state drive, USB flash drive, memory card, optical disc such as compact disc (CD) or digital versatile disc (DVD), floppy disk, magnetic tape, or any other memory components.

Disjunctive language such as the phrase "at least one of X, Y, or Z," unless specifically stated, is otherwise understood with the context as used in general to present that an item, term, and the like, may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for monitoring server-side application execution, comprising:
in an information processing apparatus comprising at least one computer processor:
deploying an application having a plurality of microservices to a cloud environment, wherein each microservice is associated with an agent that collects execution information for the microservice;
executing a transaction with the application, wherein the transaction is processed by the plurality of microservices serially;
a first microservice of the plurality of microservices assigning a unique identifier to the transaction and executing a first portion of the transaction;
the agent for the first microservice collecting first portion execution information to store in a transaction log and associating the transaction log with the unique identifier, wherein the unique identifier is communicated to other agents associated with the plurality of microservices;
a second microservice of the plurality of microservices executing a section portion of the transaction;
the agent for the second microservice collecting second portion execution information to store in the transaction log associated with the unique identifier;
outputting the transaction log in response to an unsuccessful execution of the transaction to identify a root cause of the unsuccessful execution of the transaction; and
executing a remedy action selected by an analysis module using a machine learning model based on the transaction log and on prior actions,
wherein the analysis module monitors the application for an outcome of the executed action, and
adjusts the machine learning model based on the monitored outcome.

2. The method of claim 1, wherein the first portion execution information and the second portion execution information each comprise at least one of a class name, a method name, a method signature, an argument, a return object, an exception, a field detail, a start time, an end time, and an elapsed time.

3. The method of claim 1, further comprising:
deleting the transaction log in response to successful execution of the transaction.

4. The method of claim 1, wherein the action comprises at least one of modifying input data for the transaction, adding memory resources, adding CPU resources, and adding storage resources.

5. The method of claim 1, further comprising:
replaying the execution of the transaction at a user interface based on the transaction log.

6. The method of claim 1, wherein the executed action is determined using a weight derived algorithm that scores a plurality of possible actions based on a probability of success.

7. The method of claim 6, wherein the executed action is further determined as at least one possible action of the plurality of possible actions with the probability of success above a confidence threshold.

8. A system for monitoring server-side application execution, comprising:
a cloud environment comprising an application comprising a plurality of microservices, and each microservice is associated with an agent that collects execution information for the microservice;
a data store storing a transaction log comprising the execution information for the microservices; and
a user interface that outputs the transaction log;
wherein:
a first microservice of the plurality of microservices assigns a unique identifier to a transaction and executes a first portion of the transaction;
the agent for the first microservice collects first portion execution information to store in the transaction log and associates the transaction log with the unique identifier, wherein the unique identifier is communicated to other agents associated with the plurality of microservices;
a second microservice of the plurality of microservices serially executes a section portion of the transaction;
the agent for the second microservice collects second portion execution information to store in the transaction log associated with the unique identifier;

the user interface outputs the transaction log in response to an unsuccessful execution of the transaction to identify a root cause of the unsuccessful execution of the transaction; and an analysis module identifies, via a machine learning model, a remedy action to take based on the transaction log and on prior actions, executes the remedy action, monitors the application for an outcome of the remedy action, and adjusts the machine learning model based on the monitored outcome.

9. The system of claim 8, wherein the first portion execution information and the second portion execution information each comprise at least one of a class name, a method name, a method signature, an argument, a return object, an exception, a field detail, a start time, an end time, and an elapsed time.

10. The system of claim 8, further comprising:
a director application in communication with the plurality of agents and the data store, wherein the director application deletes the transaction log in response to successful execution of the transaction.

11. The system of claim 8, wherein the action comprises at least one of modifying input data for the transaction, adding memory resources, adding CPU resources, and adding storage resources.

12. The system of claim 8, wherein the user interface further replays the execution of the transaction based on the transaction log.

13. The system of claim 8, wherein the executed action is determined using a weight derived algorithm that scores a plurality of possible actions based on a probability of success.

14. The system of claim 13, wherein the executed action is further determined as at least one possible action of the plurality of possible actions with the probability of success above a confidence threshold.

* * * * *